(12) United States Patent
Lo

(10) Patent No.: US 7,835,269 B1
(45) Date of Patent: Nov. 16, 2010

(54) FAST LINK DOWN

(75) Inventor: William Lo, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 223 days.

(21) Appl. No.: 12/122,097

(22) Filed: May 16, 2008

Related U.S. Application Data

(60) Provisional application No. 60/938,334, filed on May 16, 2007.

(51) Int. Cl.
*H04L 1/00* (2006.01)
(52) U.S. Cl. .................... 370/216; 370/252
(58) Field of Classification Search ........... 370/252, 370/253, 216, 242–248, 338
See application file for complete search history.

(56) References Cited

U.S. PATENT DOCUMENTS

| | | | |
|---|---|---|---|
| 6,215,764 B1* | 4/2001 | Wey et al. | 370/216 |
| 2002/0083231 A1* | 6/2002 | Chiang | 710/16 |
| 2007/0047525 A1* | 3/2007 | He | 370/352 |
| 2007/0248058 A1* | 10/2007 | Fajardo et al. | 370/338 |

OTHER PUBLICATIONS

IEEE Std 802.3-2002® (Revision of IEEE Std 802.3®, 2000 Edition) 802.3®; IEEE Standard for Information technology- Telecommunications and information exchange between systems- Local and metropolitan area networks- Specific requirements, Part 3: Carrier sense multiple access with collision detection (CSMA/CD) access method and physical layer specifications, IEEE Computer Society; Sponsored by the LAN/MAN Standards Committee, Mar. 8, 2002, pp. i-xxv and 1-551; Section Two: This section includes Clauses 21 through 33 and Annexes 22A through 32A, pp. 1-581; Section Three: This section incluĐse Clauses 34 through 43 and Annexes 36A through 43C, pp. 1-379.

* cited by examiner

*Primary Examiner*—Ricky Ngo
*Assistant Examiner*—Gary Mui

(57) ABSTRACT

Apparatus having corresponding methods and computer programs comprise a physical layer controller adapted to start a first timer for a physical link comprising a receive physical link; and a physical link monitor comprising a monitor module adapted to determine a local receiver status for the receive physical link, and a controller adapted to indicate a link status is OK for the physical link when the local receiver status is OK, wherein the controller comprises a speed up mode circuit to indicate the link status is FAIL for the physical link when the local receiver status is not OK and a speed up mode is enabled, regardless of the status of the first timer.

24 Claims, 9 Drawing Sheets

FAST LINK DOWN

CROSS-REFERENCE TO RELATED APPLICATIONS

This application claims the benefit of U.S. Provisional Patent Application Ser. No. 60/938,334 filed May 16, 2007, the disclosure thereof incorporated by reference herein in its entirety.

BACKGROUND

The present invention relates generally to data communications. More particularly, the present invention relates to faster link down for data communications.

Current Gigabit Ethernet (1000BASE-T) physical-layer devices (PHYs) require a significant amount of time, on the order of hundreds of milliseconds (ms) to indicate a link down condition. FIG. 1 shows a prior art Gigabit Ethernet PHY 100 in accordance with IEEE standard 802.3. Referring to FIG. 1, PHY 100 includes a physical layer controller 102, a physical layer monitor 104, and a maxwait_timer 106. In operation, PHY 100 is connected to a physical link 108. Physical link 108 includes a receive physical link 112 and a transmit physical link 114.

Physical layer controller 102 implements a PHY control state machine 200 specified by FIGS. 40-15 of IEEE standard 802.3, reproduced here as FIG. 2. Referring to FIG. 2, PHY control state machine 200 starts maxwait_timer 106 when entering the SLAVE SILENT state. The maxwait_timer 106 is used by physical layer monitor 104 to indicate a link down condition.

Physical layer monitor 104 implements a physical link monitor state machine 300 specified by FIGS. 40-16 of IEEE standard 802.3, reproduced here as FIG. 3. Referring to FIG. 3, when receive physical link 112 fails (loc_rcvr_status=NOT_OK) in the LINK UP state, physical link monitor state machine 300 will not move to the LINK DOWN state, and indicate that physical link 108 has failed (link_status=FAIL) until maxwait_timer 106 expires (maxwait_timer_done=TRUE).

According to the IEEE 802.3 standard, maxwait_timer is nominally initialized to 350±5 ms when PHY 100 is configured as a SLAVE for physical link 108, and 750±5 ms when PHY 100 is configured as a MASTER. In contrast, fault-tolerant networks are generally required to detect a faulty link, and shift data transmission from the faulty link to a non-faulty link, in 50 ms or less. Clearly, the delay imposed by maxwait_timer upon the transition of physical link monitor state machine 300 from the LINK UP state to the LINK DOWN state is too long.

One possible solution is to simply initialize maxwait_timer to a lower value. However there is a danger that the loc_rcvr_status will bounce between OK and NOT_OK during initial training, resulting in a premature entry into the LINK DOWN state of FIG. 2, which will cause the link_status variable to transition from OK to FAIL. This transition will cause the auto-negotiation arbitration state machine (FIGS. 28-16 of IEEE 802.3) to restart. When the arbitration state machine restarts, the link_control variable is set to DISABLE, which resets the IEEE 802.3 state machines shown in FIGS. 1 and 2.

SUMMARY

In general, in one aspect, an embodiment features an apparatus comprising: a physical layer controller adapted to start a first timer for a physical link comprising a receive physical link; and a physical link monitor comprising a monitor module adapted to determine a local receiver status for the receive physical link, and a controller adapted to indicate a link status is OK for the physical link when the local receiver status is OK, wherein the controller comprises a speed up mode circuit to indicate the link status is FAIL for the physical link when the local receiver status is not OK and a speed up mode is enabled, regardless of the status of the first timer.

Embodiments of the apparatus can include one or more of the following features. In some embodiments, the controller further comprises: a normal mode circuit adapted to indicate the link status is FAIL for the physical link when the local receiver status is not OK, the first timer expires, and the speed up mode is disabled. In some embodiments, the controller starts a second timer when the local receiver status is OK; and the speed up mode circuit indicates the link status is FAIL for the physical link only when the second timer has expired. In some embodiments, the controller starts a third timer when the local receiver status is OK; and the controller starts the second timer only when the third timer expires and the speed up mode is enabled. In some embodiments, the controller restarts the second timer when the second timer expires, the local receiver status is OK, and the speed up mode is enabled. In some embodiments, the controller restarts the third timer when the speed up mode changes from enabled to disabled before the second timer expires. Some embodiments comprise a physical-layer device comprising the apparatus. In some embodiments, the physical-layer device is otherwise compliant with all or part of IEEE standard 802.3. Some embodiments comprise a network device comprising the apparatus. In some embodiments, the network device is selected from the group consisting of: a network switch; a network bridge; a router; and a network interface controller.

In general, in one aspect, an embodiment features a method comprising: starting a first timer for a physical link comprising a receive physical link; determining a local receiver status for the receive physical link; indicating a link status is OK for the physical link when the local receiver status is OK; and indicating the link status is FAIL for the physical link when the local receiver status is not OK and a speed up mode is enabled, regardless of the status of the first timer.

Embodiments of the apparatus can include one or more of the following features. Some embodiments comprise indicating the link status is FAIL for the physical link when the local receiver status is not OK, the first timer expires, and the speed up mode is disabled. Some embodiments comprise starting a second timer when the local receiver status is OK; and indicating the link status is FAIL for the physical link only when the second timer has expired. Some embodiments comprise starting a third timer when the local receiver status is OK; and starting the second timer only when the third timer expires and the speed up mode is enabled. Some embodiments comprise restarting the second timer when the second timer expires, the local receiver status is OK, and the speed up mode is enabled. Some embodiments comprise restarting the third timer when the speed up mode changes from enabled to disabled before the second timer expires. In some embodiments, the method is otherwise compliant with all or part of IEEE standard 802.3.

In general, in one aspect, an embodiment features an apparatus comprising: starting a first timer for a physical link comprising a receive physical link; means for determining a local receiver status for the receive physical link; means for indicating a link status is OK for the physical link when the local receiver status is OK; and means for indicating the link status is FAIL for the physical link when the local receiver status is not OK and a speed up mode is enabled, regardless of the status of the first timer.

Embodiments of the apparatus can include one or more of the following features. Some embodiments comprise means for indicating the link status is FAIL for the physical link when the local receiver status is not OK, the first timer expires, and the speed up mode is disabled. Some embodiments comprise means for starting a second timer when the local receiver status is OK; and means for indicating the link status is FAIL for the physical link only when the second timer has expired. Some embodiments comprise means for starting a third timer when the local receiver status is OK; and means for starting the second timer only when the third timer expires and the speed up mode is enabled. Some embodiments comprise means for restarting the second timer when the second timer expires, the local receiver status is OK, and the speed up mode is enabled. Some embodiments comprise means for restarting the third timer when the speed up mode changes from enabled to disabled before the second timer expires. In some embodiments, the apparatus is otherwise compliant with all or part of IEEE standard 802.3.

In general, in one aspect, an embodiment features a computer program executable on a processor, comprising: instructions for starting a first timer for a physical link comprising a receive physical link; instructions for determining a local receiver status for the receive physical link; instructions for indicating a link status is OK for the physical link when the local receiver status is OK; and instructions for indicating the link status is FAIL for the physical link when the local receiver status is not OK and a speed up mode is enabled, regardless of the status of the first timer.

Embodiments of the computer program can include one or more of the following features. Some embodiments comprise instructions for indicating the link status is FAIL for the physical link when the local receiver status is not OK, the first timer expires, and the speed up mode is disabled. Some embodiments comprise instructions for starting a second timer when the local receiver status is OK; and indicating the link status is FAIL for the physical link only when the second timer has expired. Some embodiments comprise instructions for starting a third timer when the local receiver status is OK; and instructions for starting the second timer only when the third timer expires and the speed up mode is enabled. Some embodiments comprise instructions for restarting the second timer when the second timer expires, the local receiver status is OK, and the speed up mode is enabled. Some embodiments comprise instructions for restarting the third timer when the speed up mode changes from enabled to disabled before the second timer expires. In some embodiments, the computer program is otherwise compliant with all or part of IEEE standard 802.3.

The details of one or more implementations are set forth in the accompanying drawings and the description below. Other features will be apparent from the description and drawings, and from the claims.

Figure 1:
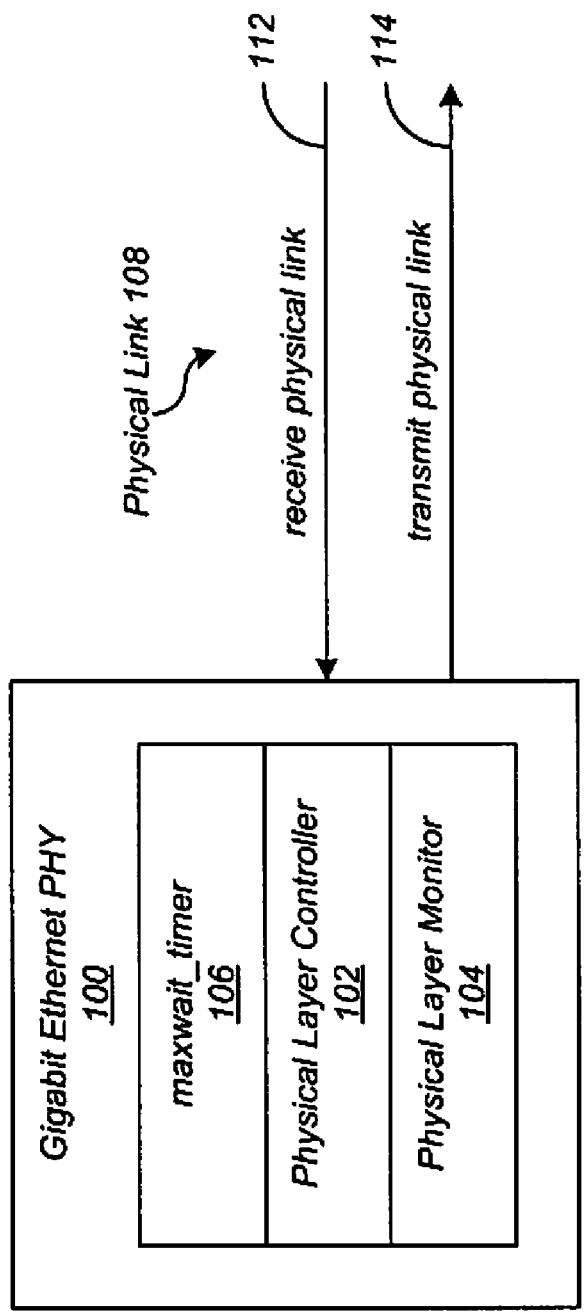
FIG. 1 shows a prior art Gigabit Ethernet PHY in accordance with IEEE standard 802.3.

The leading digit(s) of each reference numeral used in this specification indicates the number of the drawing in which the reference numeral first appears.

DETAILED DESCRIPTION

Embodiments of the present invention provide fast link down detection and indication for network devices such as Gigabit Ethernet devices. However, while embodiments of the present invention are described in terms of Gigabit Ethernet devices, embodiments of the present invention apply to other sorts of network devices as well, as will be apparent from the disclosure and teachings provided herein. Some embodiments of the present invention are otherwise compliant with all or part of IEEE standard 802.3, the disclosure thereof incorporated by reference herein in its entirety.

Figure 4:
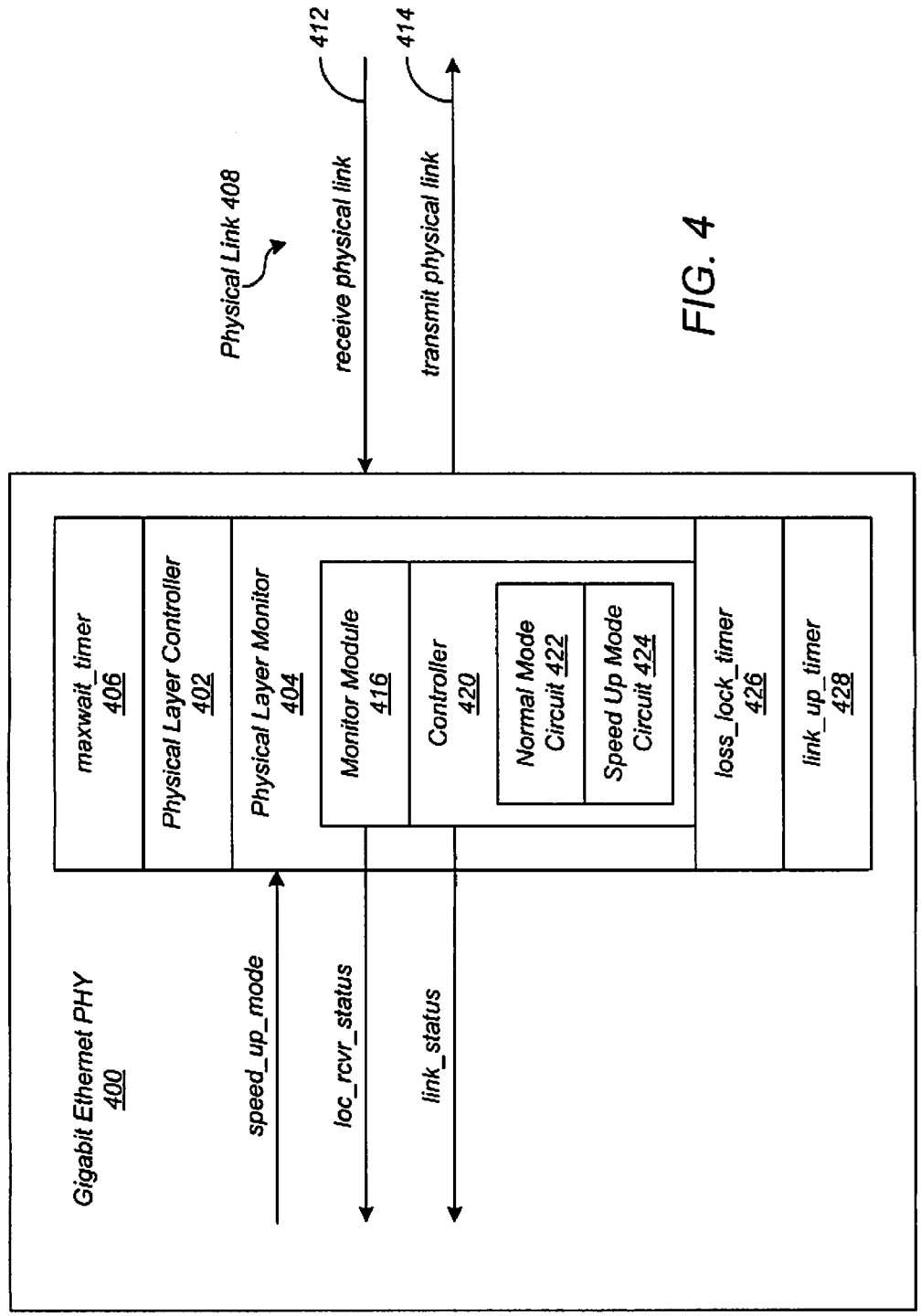
FIG. 4 shows a Gigabit Ethernet PHY according to an embodiment of the present invention.

FIG. 4 shows a Gigabit Ethernet PHY 400 according to an embodiment of the present invention. Although in the described embodiments, the elements of Gigabit Ethernet PHY 400 are presented in one arrangement, other embodiments may feature other arrangements, as will be apparent to one skilled in the relevant arts based on the disclosure and teachings provided herein. For example, the elements of Gigabit Ethernet PHY 400 can be implemented in hardware, software, or combinations thereof. Gigabit Ethernet PHY 400 can be implemented as a network device such as a switch, router, network bridge, network interface controller (NIC), and the like.

Referring to FIG. 4, PHY 400 includes a physical layer controller 402, a physical layer monitor 404, and a maxwait_timer 406. In operation, PHY 400 is connected to a physical link 408. Physical link 408 includes a receive physical link 412 and a transmit physical link 414.

Figure 2:
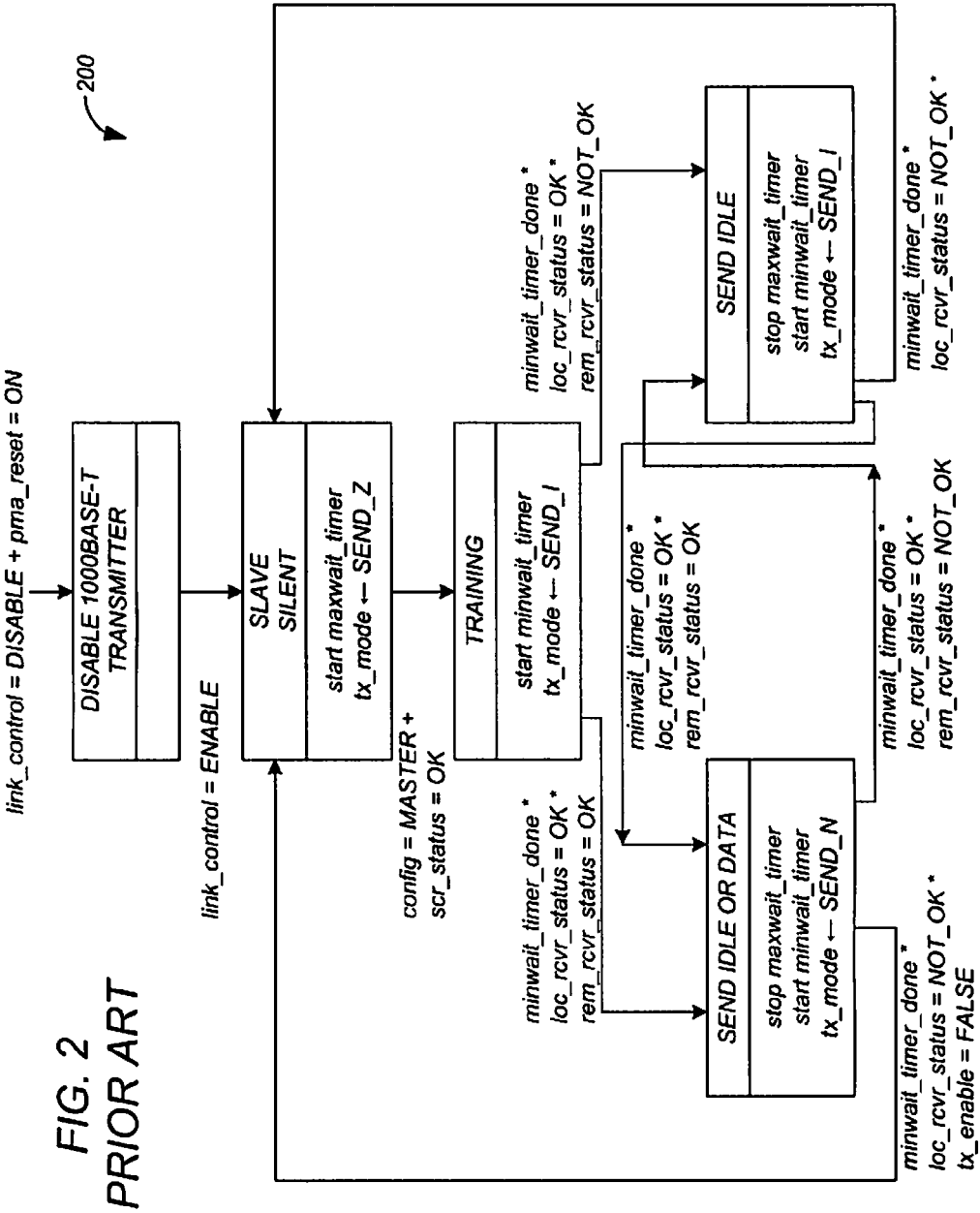
FIG. 2 shows the PHY control state machine specified by FIGS. 40-15 of IEEE standard 802.3.
Figure 3:
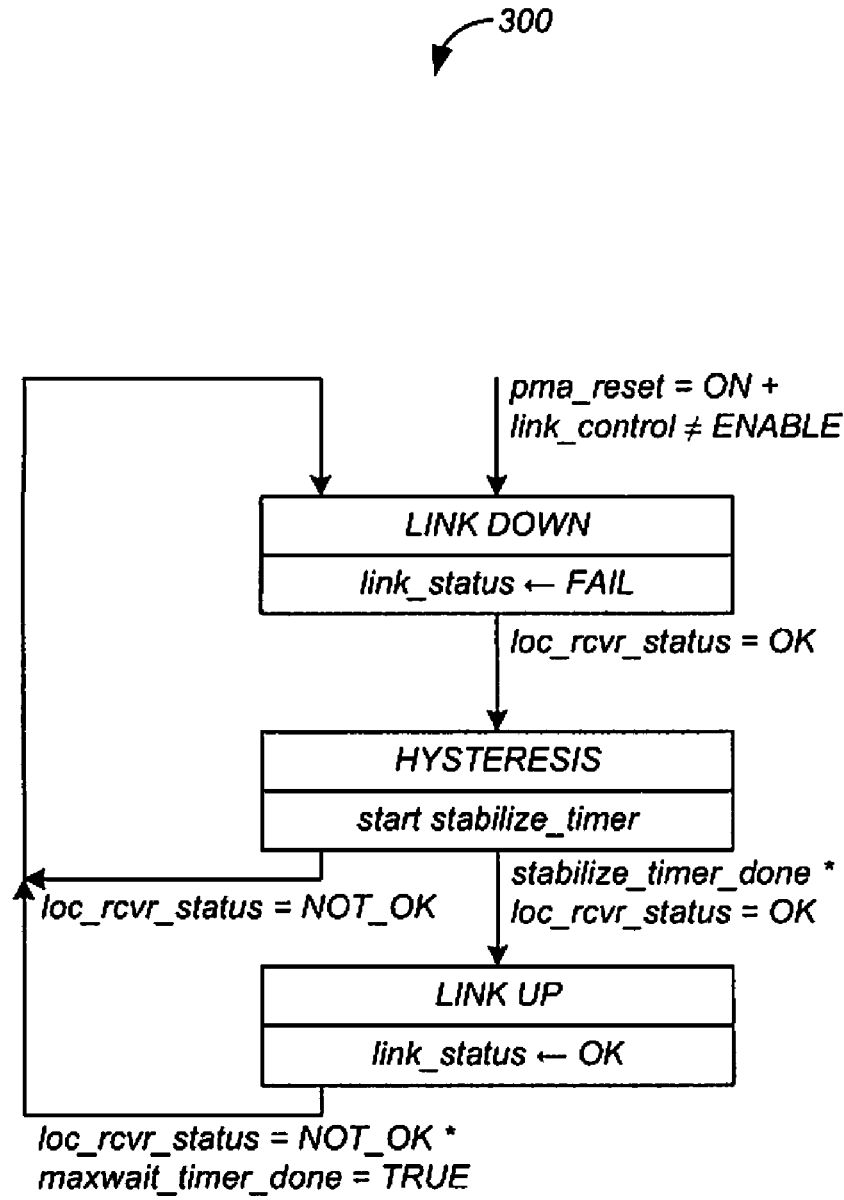
FIG. 3 shows the link monitor state machine specified by FIGS. 40-16 of IEEE standard 802.3.

Physical layer controller 402 implements a PHY control state machine such as that specified by FIGS. 40-15 of IEEE standard 802.3, reproduced here as FIG. 2. Referring to FIG. 2, PHY control state machine 200 starts maxwait_timer 406 when entering the SLAVE SILENT state. The maxwait_timer 406 is used by physical layer monitor 404 to indicate a link down condition.

Physical layer monitor 404 includes a monitor module 416 adapted to determine a local receiver status (loc_rcvr_status) for receive physical link 412, and a controller 420 adapted to indicate a link status (link_status) for physical link 408 in accordance with a speed up mode signal (speed_up_mode), a loss lock timer (loss_lock_timer) 426, and a link up timer (link_up_timer) 428. Controller 420 includes a normal mode circuit 422 and a speed up mode circuit 424. Normal mode circuit 422 is adapted to indicate the link status is FAIL for physical link 408 when the local receiver status is not OK, maxwait_timer 406 expires, and speed up mode is disabled (loc_rcvr_status=NOT_OK*maxwait_timer done*speed_up=disabled). Speed up mode circuit 424 is adapted to indicate the link status is FAIL for physical link 408 when the local receiver status is not OK and the speed up mode is enabled (loc_rcvr_status=NOT_OK*speed_up=disabled). Note that in speed up mode, maxwait_timer 406 is not used to delay indication of the failure of physical link 408.

Figure 5:
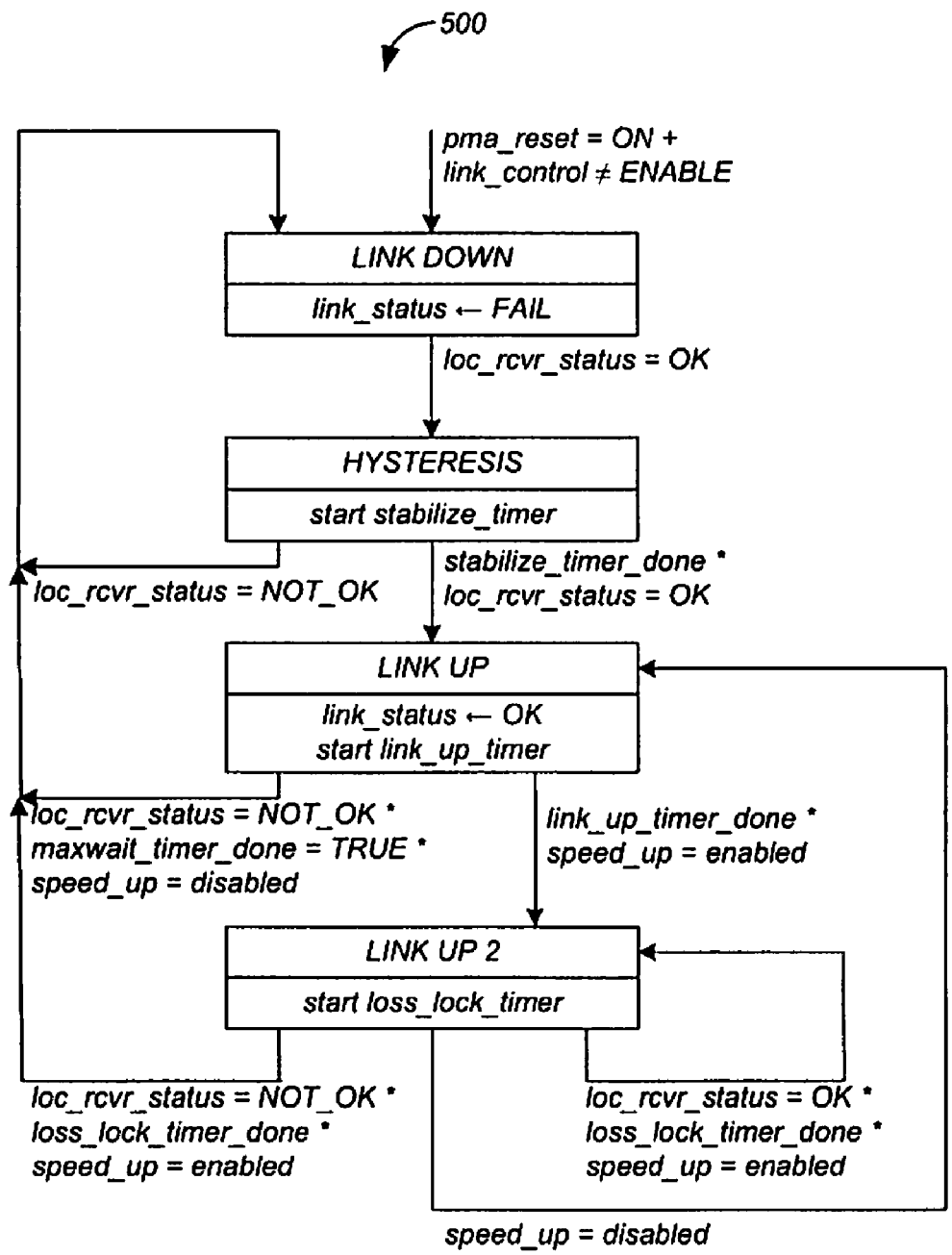
FIG. 5 shows a physical link monitor state machine for the Gigabit Ethernet PHY of FIG. 4 according to an embodiment of the present invention.

Controller 420 implements a physical link monitor state machine 500 according to an embodiment of the present invention, as shown in FIG. 5. Referring to FIG. 5, state machine 500 enters a LINK DOWN state when pma_reset=ON+link_control≠ENABLE, as specified by IEEE standard 802.3. When state machine 500 enters the LINK DOWN state, controller 420 asserts link_status=FAIL.

However, when monitor module 416 determines the local receiver status is OK (loc_rcvr_status=OK), state machine 500 moves to a HYSTERESIS state. When state machine 500 enters the HYSTERESIS state, controller 420 starts a stabilize timer (start stabilize_timer). If during the HYSTERESIS state, monitor module 416 determines the local receiver status is not OK (loc_rcvr_status=NOT_OK), state machine 500 returns to the LINK DOWN state. But if, when the stabilize timer expires, the local receiver status is OK (stabilize_timer_done*loc_rcvr_status=OK), state machine 500 moves to a LINK UP state.

When state machine 500 enters the LINK UP state, controller 420 asserts link_status=OK, and starts link up timer 428 (start link_up_timer). For example, link up timer 428 can be initialized to one second or more to ensure that the local receiver status (loc_rcvr_status) has stabilized. Exit from the LINK UP state depends on the speed up mode signal (speed_up_mode).

If during the LINK UP state, speed up mode is disabled, monitor module 416 determines the local receiver status is not OK, and maxwait_timer 406 expires (loc_rcvr_status=NOT_OK*maxwait_timer_done=TRUE*speed_up=disabled), then state machine 500 returns to the LINK DOWN state. But if during the LINK UP state, speed up mode is enabled and link_up_timer 428 expires (link_up_timer_done*speed_up=enabled), state machine 500 moves to a LINK UP 2 state.

When state machine 500 enters the LINK UP 2 state, controller 420 starts a loss lock timer 426 (start loss_lock_timer). For example, loss lock timer 426 can be initialized to less than 50 ms (or even to 0 ms) to ensure a rapid transition to the LINK DOWN state when the local receiver status is not OK (loc_rcvr_status=NOT_OK). Exit from the LINK UP 2 state also depends on the speed up mode signal (speed_up_mode).

If during the LINK UP 2 state, speed up mode is disabled (speed_up=disabled), then state machine 500 returns to the LINK UP state. And if during the LINK UP 2 state, speed up mode is enabled and the local receiver status is OK when loss lock timer 426 expires (loc_rcvr_status=OK*loss_lock_timer_done*speed_up= enabled), state machine 500 returns to the LINK UP 2 state. But if during the LINK UP 2 state, speed up mode is enabled and the local receiver status is not OK when loss lock timer 426 expires (loc_rcvr_status=NOT_OK*loss_lock_timer_done*speed_up=enabled), state machine 500 returns to the LINK DOWN state regardless of the status of maxwait_timer 406. Note that this transition is governed by loss_lock_timer 426 rather than maxwait_timer 406. Therefore Gigabit Ethernet PHY 400 achieves fast link down detection and indication.

Figure 6:
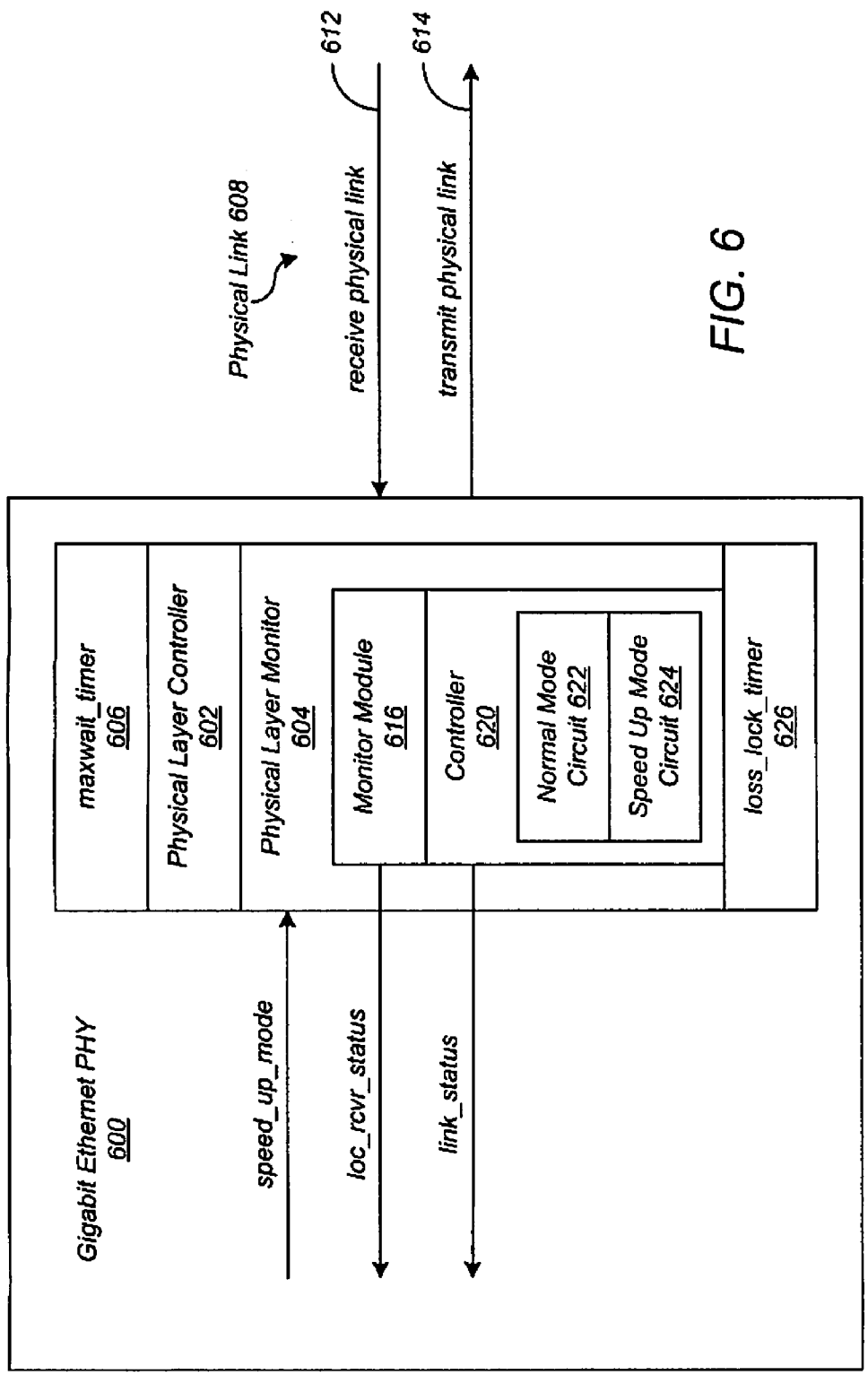
FIG. 6 shows a Gigabit Ethernet PHY that does not employ a link_up_timer according to an embodiment of the present invention.

In some embodiments, link_up_timer 428 is not used. FIG. 6 shows a Gigabit Ethernet PHY 600 according to such an embodiment of the present invention. Although in the described embodiments, the elements of Gigabit Ethernet PHY 600 are presented in one arrangement, other embodiments may feature other arrangements, as will be apparent to one skilled in the relevant arts based on the disclosure and teachings provided herein. For example, the elements of Gigabit Ethernet PHY 600 can be implemented in hardware, software, or combinations thereof. Gigabit Ethernet PHY 600 can be implemented as a network device such as a switch, router, network bridge, network interface controller (NIC), and the like.

Referring to FIG. 6, PHY 600 includes a physical layer controller 602, a physical layer monitor 604, and a maxwait_timer 606. In operation, PHY 600 is connected to a physical link 608. Physical link 608 includes a receive physical link 612 and a transmit physical link 614.

Physical layer controller 602 implements a PHY control state machine such as that specified by FIGS. 40-15 of IEEE standard 802.3, reproduced here as FIG. 2. Referring to FIG. 2, PHY control state machine 200 starts maxwait_timer 606 when entering the SLAVE SILENT state. The maxwait_timer 606 is used by physical layer monitor 604 to indicate a link down condition.

Physical layer monitor 604 includes a monitor module 616 adapted to determine a local receiver status (loc_rcvr_status) for receive physical link 612, and a controller 620 adapted to indicate a link status (link_status) for physical link 608 in accordance with a speed up mode signal (speed_up_mode), and a loss lock timer (loss_lock_timer) 626. Controller 620 includes a normal mode circuit 622 and a speed up mode circuit 624. Normal mode circuit 622 is adapted to indicate the link status is FAIL for physical link 608 when the local receiver status is not OK, maxwait_timer 606 expires, and speed up mode is disabled (loc_rcvr_status=NOT_OK*maxwait_timer_done*speed_up=disabled). Speed up mode circuit 624 is adapted to indicate the link status is FAIL for physical link 608 when the local receiver status is not OK and the speed up mode is enabled (loc_rcvr_status=NOT_OK*speed_up=disabled). Note that in speed up mode, maxwait_timer 606 is not used to delay indication of the failure of physical link 608.

Figure 7:
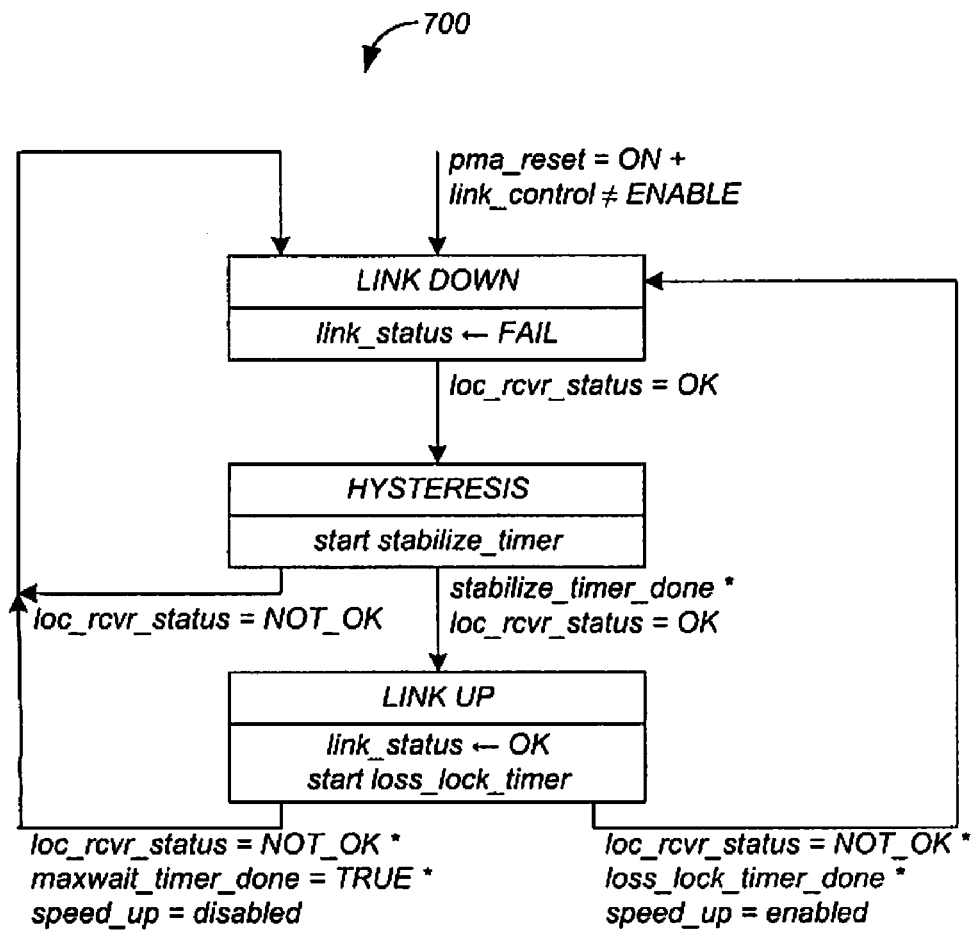
FIG. 7 shows a physical link monitor state machine for the Gigabit Ethernet PHY of FIG. 6 according to an embodiment of the present invention.

Controller 620 implements a physical link monitor state machine 700 according to an embodiment of the present invention, as shown in FIG. 7. Referring to FIG. 7, state machine 700 enters a LINK DOWN state when pma_reset=ON+link_control≠ENABLE, as specified by IEEE standard 802.3. When state machine 700 enters the LINK DOWN state, controller 620 asserts link_status=FAIL.

However, when monitor module 616 determines the local receiver status is OK (loc_rcvr_status=OK), state machine 700 moves to a HYSTERESIS state. When state machine 700 enters the HYSTERESIS state, controller 620 starts a stabilize timer (start stabilize_timer). If during the HYSTERESIS state, monitor module 616 determines the local receiver status is not OK (loc_rcvr_status=NOT_OK), state machine 700 returns to the LINK DOWN state. But if, when the stabilize timer expires, the local receiver status is OK (stabilize_timer_done*loc_rcvr_status=OK), state machine 700 moves to a LINK UP state.

When state machine 700 enters the LINK UP state, controller 620 asserts link_status=OK, and starts loss lock timer 626 (start loss_lock_timer). For example, loss lock timer 626 can be initialized to less than 50 ms (or even to 0 ms) to ensure a rapid transition to the LINK DOWN state when the local receiver status is not OK (loc_rcvr_status=NOT_OK). Exit from the LINK UP state also depends on the speed up mode signal (speed_up_mode).

If during the LINK UP state, speed up mode is disabled, monitor module 616 determines the local receiver status is not OK, and maxwait_timer 606 expires (loc_rcvr_status=NOT_OK*maxwait_timer_done=TRUE*speed_up=disabled), then state machine 700 returns to the LINK DOWN state. But if during the LINK UP state, speed up mode is enabled and the local receiver status is not OK when loss lock timer 626 expires (loc_rcvr_status=NOT_OK*loss_lock_timer_done*speed_up=enabled), state machine 700 returns to the LINK DOWN state regardless of the status of maxwait_timer 606. Note that this transition is governed by loss_lock_timer 626 rather than maxwait_timer 606. Therefore Gigabit Ethernet PHY 600 achieves fast link down detection and indication.

Figure 8:
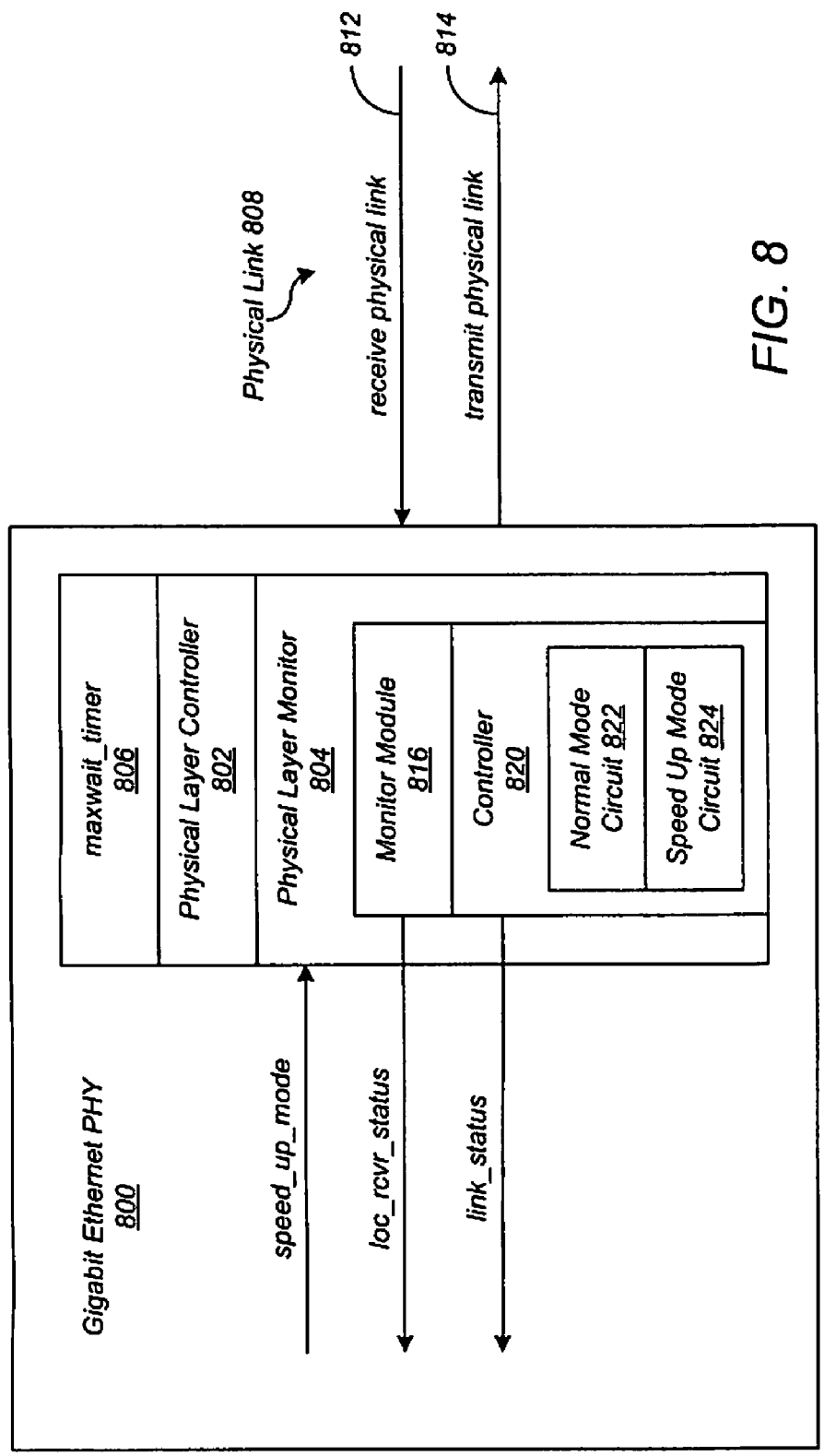
FIG. 8 shows a Gigabit Ethernet PHY that employs neither a link_up_timer nor a loss_lock_timer according to an embodiment of the present invention.

In some embodiments, neither link_up_timer 428 nor loss_lock_timer 426 are used. FIG. 8 shows a Gigabit Ethernet PHY 800 according to such an embodiment of the present invention. Although in the described embodiments, the elements of Gigabit Ethernet PHY 800 are presented in one arrangement, other embodiments may feature other arrangements, as will be apparent to one skilled in the relevant arts based on the disclosure and teachings provided herein. For example, the elements of Gigabit Ethernet PITY 800 can be implemented in hardware, software, or combinations thereof. Gigabit Ethernet PHY 800 can be implemented as a network device such as a switch, router, network bridge, network interface controller (NIC), and the like.

Referring to FIG. 8, PHY 800 includes a physical layer controller 802, a physical layer monitor 804, and a maxwait_timer 806. In operation, PHY 800 is connected to a physical link 808. Physical link 808 includes a receive physical link 812 and a transmit physical link 814.

Physical layer controller 802 implements a PHY control state machine such as that specified by FIGS. 40-15 of IEEE standard 802.3, reproduced here as FIG. 2. Referring to FIG. 2, PHY control state machine 200 starts maxwait_timer 806 when entering the SLAVE SILENT state. The maxwait_timer 806 is used by physical layer monitor 804 to indicate a link down condition.

Physical layer monitor 804 includes a monitor module 816 adapted to determine a local receiver status (loc_rcvr_status) for receive physical link 812, and a controller 820 adapted to indicate a link status (link_status) for physical link 808 in accordance with a speed up mode signal (speed_up_mode). Controller 820 includes a normal mode circuit 822 and a speed up mode circuit 824. Normal mode circuit 822 is adapted to indicate the link status is FAIL for physical link 808 when the local receiver status is not OK, maxwait_timer 806 expires, and speed up mode is disabled (loc_rcvr_status=NOT_OK*maxwait_timer_done speed_up=disabled). Speed up mode circuit 824 is adapted to indicate the link status is FAIL for physical link 808 when the local receiver status is not OK and the speed up mode is enabled (loc_rcvr_status=NOT_OK*speed_up=disabled). Note that in speed up mode, maxwait_timer 806 is not used to delay indication of the failure of physical link 808.

Figure 9:
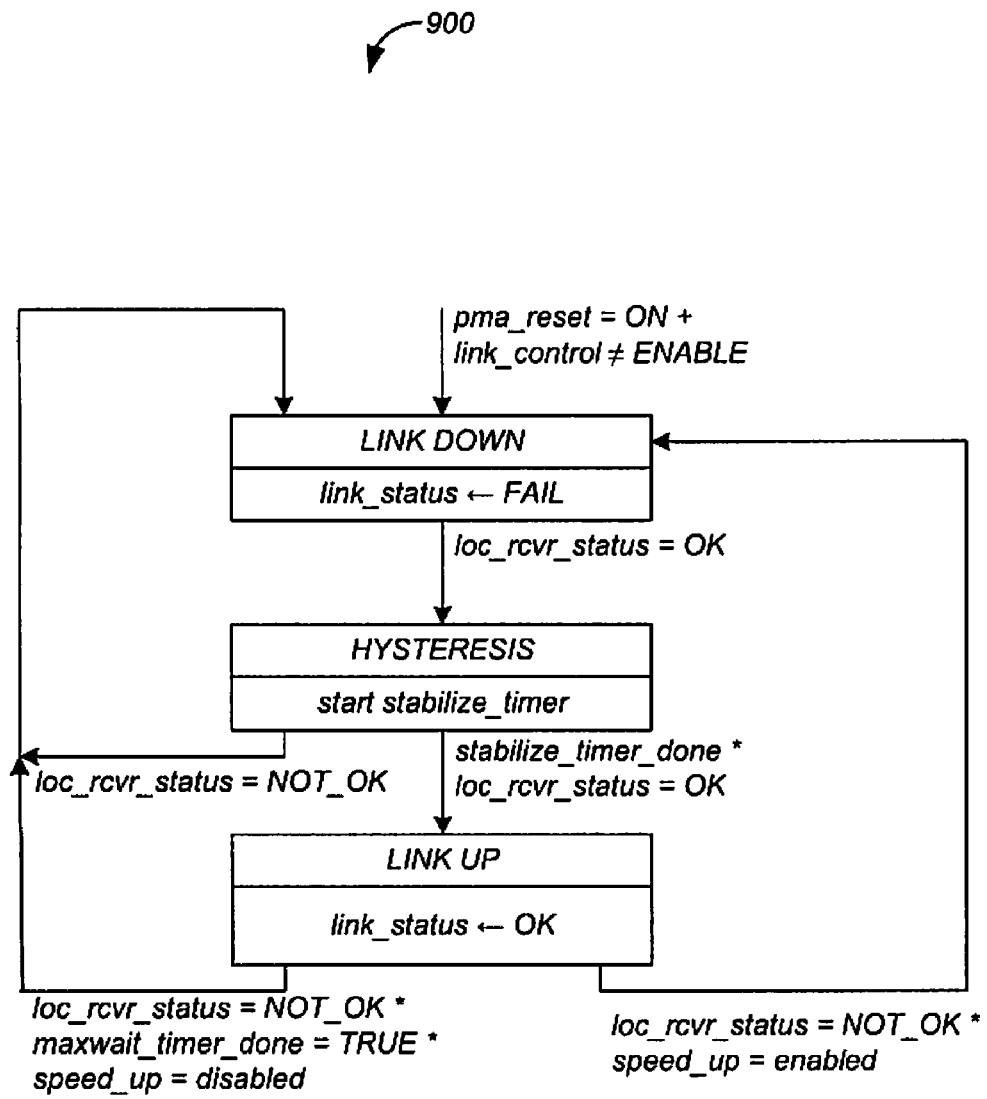
FIG. 9 shows a physical link monitor state machine for the Gigabit Ethernet PHY of FIG. 8 according to an embodiment of the present invention.

Controller 820 implements a physical link monitor state machine 900 according to an embodiment of the present invention, as shown in FIG. 9. Referring to FIG. 9, state machine 900 enters a LINK DOWN state when pma_reset=ON+link_control≠ENABLE, as specified by IEEE standard 802.3. When state machine 900 enters the LINK DOWN state, controller 820 asserts link_status=FAIL.

However, when monitor module 816 determines the local receiver status is OK (loc_rcvr_status=OK), state machine 900 moves to a HYSTERESIS state. When state machine 900 enters the HYSTERESIS state, controller 820 starts a stabilize timer (start stabilize_timer). If during the HYSTERESIS state, monitor module 816 determines the local receiver status is not OK (loc_rcvr_status=NOT_OK), state machine 900 returns to the LINK DOWN state. But if, when the stabilize timer expires, the local receiver status is OK (stabilize_timer_done*loc_rcvr_status=OK), state machine 900 moves to a LINK UP state.

When state machine 900 enters the LINK UP state, controller 820 asserts link_status=OK. Exit from the LINK UP state also depends on the speed up mode signal (speed_up_mode).

If during the LINK UP state, speed up mode is disabled, monitor module 816 determines the local receiver status is not OK, and maxwait_timer 806 expires (loc_rcvr_status=NOT_OK*maxwait_timer_done=TRUE *speed_up=disabled), then state machine 900 returns to the LINK DOWN state. But if during the LINK UP state, speed up mode is enabled and the local receiver status is not OK (loc_rcvr_status=NOT_OK*speed_up=enabled), state machine 900 returns to the LINK DOWN state regardless of the status of maxwait_timer 706. Note that this transition is not governed by maxwait_timer 806. Therefore Gigabit Ethernet PHY 800 achieves fast link down detection and indication.

Embodiments of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. An apparatus comprising:
a physical layer controller to start a first timer for a physical link, the physical link comprising a receive physical link; and
a physical link monitor comprising:
a monitor module to determine a local receiver status for the receive physical link, and
a controller to indicate a link status is OK for the physical link when the local receiver status is OK, wherein the controller comprises:
a speed up mode circuit to indicate, regardless of the status of the first timer, that the link status is FAIL for the physical link when (i) the local receiver status is not OK and (ii) a speed up mode is enabled to reduce delay in indicating the link status is FAIL.

2. The apparatus of claim 1, wherein the controller further comprises:
a normal mode circuit to indicate the link status is FAIL for the physical link when (i) the local receiver status is not OK, (ii) the first timer expires, and (iii) the speed up mode is disabled.

3. The apparatus of claim 2:
wherein the controller starts a second timer when the local receiver status is OK; and
wherein the speed up mode circuit indicates the link status is FAIL for the physical link only when the second timer has expired.

4. The apparatus of claim 3:
wherein the controller starts a third timer when the local receiver status is OK; and
wherein the controller starts the second timer only when the third timer expires and the speed up mode is enabled.

5. The apparatus of claim 4:
wherein the controller restarts the second timer when (i) the second timer expires, (ii) the local receiver status is OK, and (iii) the speed up mode is enabled.

6. The apparatus of claim 5:
wherein the controller restarts the third timer when the speed up mode changes from enabled to disabled before the second timer expires.

7. A physical-layer device comprising the apparatus of claim 1.

8. The physical-layer device of claim 7, wherein the physical-layer device is otherwise compliant with all or part of IEEE standard 802.3.

9. A network device comprising the physical-layer device of claim 8.

10. The network device of claim 9, wherein the network device is selected from the group consisting of:
a network switch;
a network bridge;
a router; and
a network interface controller.

11. A method comprising:
starting a first timer for a physical link, the physical link comprising a receive physical link;
determining a local receiver status for the receive physical link;
indicating a link status is OK for the physical link when the local receiver status is OK; and
regardless of the status of the first timer, indicating the link status is FAIL for the physical link when (i) the local receiver status is not OK and (ii) a speed up mode is enabled to reduce delay in indicating the link status is FAIL.

12. The method of claim 11, further comprising:
indicating the link status is FAIL for the physical link when (i) the local receiver status is not OK, (ii) the first timer expires, and (iii) the speed up mode is disabled.

13. The method of claim 12, further comprising:
starting a second timer when the local receiver status is OK; and
indicating the link status is FAIL for the physical link only when the second timer has expired.

14. The method of claim 13, further comprising:
starting a third timer when the local receiver status is OK; and
starting the second timer only when the third timer expires and the speed up mode is enabled.

15. The method of claim 14, further comprising:
restarting the second timer when (i) the second timer expires, (ii) the local receiver status is OK, and (iii) the speed up mode is enabled.

16. The method of claim 15, further comprising:
restarting the third timer when the speed up mode changes from enabled to disabled before the second timer expires.

17. The method of claim 11, wherein the method is otherwise compliant with all or part of IEEE standard 802.3.

18. An apparatus comprising:
means for starting a first timer for a physical link, the physical link comprising a receive physical link;
means for determining a local receiver status for the receive physical link;
means for indicating a link status is OK for the physical link when the local receiver status is OK; and
means for indicating, regardless of the status of the first timer, that the link status is FAIL for the physical link when (i) the local receiver status is not OK and (ii) a speed up mode is enabled to reduce delay in indicating the link status is FAIL.

19. The apparatus of claim 18, further comprising:
means for indicating the link status is FAIL for the physical link when (i) the local receiver status is not OK, (ii) the first timer expires, and (iii) the speed up mode is disabled.

20. The apparatus of claim 19, further comprising:
means for starting a second timer when the local receiver status is OK; and
means for indicating the link status is FAIL for the physical link only when the second timer has expired.

21. The apparatus of claim 20, further comprising:
means for starting a third timer when the local receiver status is OK; and
means for starting the second timer only when the third timer expires and the speed up mode is enabled.

22. The apparatus of claim 21, further comprising:
means for restarting the second timer when (i) the second timer expires, (ii) the local receiver status is OK, and (iii) the speed up mode is enabled.

23. The apparatus of claim 22, further comprising:
means for restarting the third timer when the speed up mode changes from enabled to disabled before the second timer expires.

24. The apparatus of claim 18, wherein the apparatus is otherwise compliant with all or part of IEEE standard 802.3.

* * * * *